Figure 1:
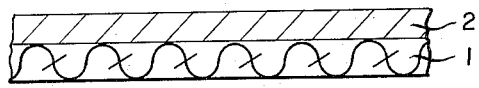

March 13, 1962 W. R. SCHMIDT 3,025,185
HEAT STABLE COATED FABRIC COMPRISING WHOLLY AROMATIC POLYAMIDE
FABRIC COATED WITH COPOLYMER OF VINYLIDENE
FLUORIDE AND HEXAFLUOROPROPENE
Filed Aug. 21, 1957

INVENTOR
WEBSTER R. SCHMIDT

BY

AGENT

United States Patent Office 3,025,185
Patented Mar. 13, 1962

3,025,185
HEAT STABLE COATED FABRIC COMPRISING WHOLLY AROMATIC POLYAMIDE FABRIC COATED WITH COPOLYMER OF VINYLIDENE FLUORIDE AND HEXAFLUOROPROPENE
Webster R. Schmidt, Wilmington, Del., assignor to E. I. du Pont de Nemours and Company, Wilmington, Del., a corporation of Delaware
Filed Aug. 21, 1957, Ser. No. 679,529
8 Claims. (Cl. 117—138.8)

This invention relates to rubber-like sheet materials which are serviceable at elevated temperatures, and more particularly to a fluorinated elastomer coated fabric and a method of making same.

In the manufacture of modern aircraft there is need for a durable sheet material having rubber-like flexibility, good resistance to fuels and lubricants, and extraordinary heat stability. The rapidly expanding guided missile industry is also demanding a rubber-like sheet material which remains strong and flexible during and after use at temperatures up to about 500° F. This material is needed for making such items as fuel cells, gaskets and diaphragms, and must therefore have exceptional chemical resistance as well as heat stability.

Among previously known flexible sheet materials, certain elastomer coated fabrics come the closest to satisfying the above-mentioned requirements. But even the best of these are deficient in at least one important property, e.g., heat stability, flexibility, solvent resistance, or chemical resistance. For example, when a heat resistant fabric such as glass fabric is coated with an elastomeric copolymer of vinylidene fluoride and hexafluoropropene, the product is unsatisfactory as evidenced by the serious loss in tensile and tear strengths when exposed to a temperature of 500° F. for 5 days. When a high quality polyethylene terephthalate fabric is substituted for the glass fabric, the product has even less heat stability. When made with a polytetrafluoroethylene fabric, the product is uneconomical and the coating does not adhere well to the fabric, in addition, the high temperature tensile strength is poor.

If coatings of other heat resistant elastomers are applied to glass fabric in attempts to make a suitable product, the coated fabric in each case is inferior to the vinylidene fluoride-hexafluoropropene elastomer coated product in either heat stability or resistance to chemicals and solvents, or both. Examples of these other elastomers are silicone rubber, fluorinated silicone rubber, vinylidene fluoride-chlorotrifluoroethylene copolymer and fluorinated butyl acrylate.

The principal object of this invention is to provide an improved elastomer coated fabric characterized by exceptionally high resistance to chemicals, solvents and cracking upon flexing, and resistant to serious loss of strength after exposure to temperaures up to about 500° F. for extended periods. Another object is to provide a method for making such a product. Other objects will be apparent from the following description of the invention.

It has been discovered that the above objects can be accomplished by coating a fabric made from filaments of certain high molecular weight aromatic polyamides with a curable elastomer composition comprising a copolymer which contains about 30 to 70% by weight of vinylidene fluoride units and about 70 to 30% by weight of hexafluoropropene units and heating the coating sufficiently to cure the copolymer.

The above-mentioned aromatic polyamides are those polymers characterized predominantly by the structural unit

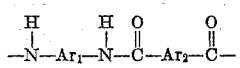

wherein $Ar_1$ and $Ar_2$ is the same or different and is an unsubstituted divalent aromatic radical or a substituted divalent aromatic radical. The chain-extending bonds of these divalent aromatic radicals are oriented meta or para to one another and the substituents attached to any aromatic nucleus are one or more or a mixture of lower alkyl, lower alkoxy, halogen, nitro, lower carbalkoxy, or other groups which do not form a polyamide during polymerization. The aromatic polyamides useful in carrying out this invention have an inherent viscosity of at least 0.8 in concentrated sulfuric acid at 30° C., and a melting point of at least 300° C. They are prepared in accordance with the teaching set forth in copending application Serial Number 642,928, filed February 28, 1957, by Hill, Kwolek and Sweeny, and now abandoned.

The inherent viscosity value mentioned above is determined in sulfuric acid (sp. gr. 1.841 at 60° F.) at 30° C. at a concentration of 0.5 gram polymer per 100 cc. of solution. Melting point is determined by conventional procedures such as described in "The Systematic Identification of Organic Compounds," pages 85–87, by R. L. Schriner and R. E. Fuson (John Wiley and Sons, N.Y., third edition, 1940).

Figure 2:
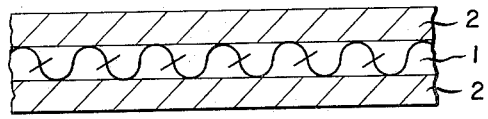
Figure 3:
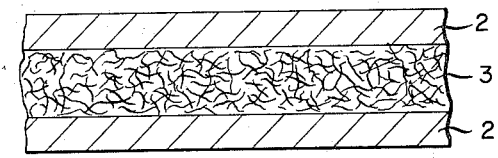

FIGURE 1 of the following drawing is a cross-section illustration of a wholly aromatic polyamide woven fabric 1 having a surface coating 2 of a copolymer of about 30–70% by weight of vinylidene fluoride and 70–30% by weight of hexafluoropropene. FIGURE 2 is a cross-section illustration of a product similar to that illustrated in FIGURE 1, except the coating 2 is applied to both sides of the fabric 1. FIGURE 3 is a cross-section illustration of a product similar to that illustrated in FIGURE 2, except a non-woven fabric 3 of wholly aromatic fibers replaces the woven fabric 1.

The following examples, wherein parts and percents are by weight unless otherwise specified, illustrate specific embodiments of this invention.

*Example I*

A heat resistant aromatic polyamide fabric is woven from 160 denier/50 filament yarn made from continuous filaments of a high molecular weight polymer identified as poly(metaphenylene isophthalamide). The yarn has a tenacity of 3.9 grams per denier, an elongation value of 45%, and a modulus of 70 grams per denier. Specifications of the fabric are as follows:

Thickness _____ 5 mils.
Width _____ 14 inches.
Weight _____ 2.6 oz. per sq. yd.
Weave _____ Plain (one over one).
Thread count _____ 62 x 61 per inch (warp and filler).
Tensile strength _____ 27.8 lbs. per in. in both directions at 25% elongation (Method 5100[1]).
Tongue tear strength _ 19.0 lbs. in both directions (Method 5134[1]).

[1] Methods according to Federal Spec. CCC–T–191b, "Textile Test Methods," dated May 15, 1951.

A coating composition comprising a fluorinated elastomer is prepared in 3 stages as follows:

First stage: A so-called "mill mix," formulated as indicated below, is thoroughly blended on a 2-roll rubber mill:

| | Parts |
|---|---|
| Elastomeric reaction product of 50 parts vinylidene fluoride and 50 parts hexafluoropropene | 250 |
| Zinc oxide | 25 |
| Dibasic lead phosphite (Dyphos) | 25 |
| Hydrated silica (Hi-Sil 303) | 50 |

350

Second stage: With mild agitation, 350 parts of the above blended mill mix is dissolved in 345 parts of methyl ethyl ketone to make 695 parts of solution.

Third stage: Fifteen parts of benzoyl peroxide dissolved in 90 parts of toluol are mixed with the above solution, making a total of 800 parts of coating composition.

Employing a doctor knife, four coats of the above described elastomeric coating composition are applied to each side of the above described polyamide fabric, with forced drying after each coat to remove most of the volatile components. The coated fabric, about 14 mils thick and substantially dry, is dusted on both sides with "Serecite" mica to minimize surface tack. The coated fabric is press cured for 10 minutes under a pressure of 50 to 60 p.s.i. and a platen temperature of 330° F. The pressed and partially cured material is then transferred to an oven, where the temperature is gradually raised over a 2 hour period to 400° F. to allow any residual volatile components to escape without causing blisters in the coating. After the 2-hour period, the coated fabric is heated with an ambient temperature of 400° F. for 24 hours, thus completing the elastomer curing cycle.

The fully cured elastomer coated fabric of this example has a tensile strength of 68×75 lbs. per in. (warp×filler) when tested in accordance with Method 5102 of Fed. Spec. CCC–T–191b, dated May 15, 1951. After 5 days of exposure to an ambient temperature of 500° F., the tensile strength of the product is substantially unchanged.

The tear strength (trapezoid) of the product of this example is initially 4.8×2.5 lbs. (warp×filler) when tested by Method 5136 of Fed. Spec. CCC–T–191b, dated May 15, 1951. After the product is heated for 5 days at an ambient temperature of 500° F., it still has over 75% of its original tear strength.

When a glass fabric is coated in the same manner and with the same composition used in this example, the resulting product loses over 50% of its tensile strength and retains only 15 to 30% of its tear strength after being subjected to an ambient temperature of 500° F. for 5 days.

The new coated fabric produced in accordance with this example is thus characterized by a totally unexpected and extraordinary degree of heat stability. Even while the product is at the elevated temperature (500 °F.), it has good tensile and tear properties.

The rubber-like flexibility and durability of this product are substantially unchanged after 24 hours of immersion at 80° F. in any one of the following solvents and chemicals: gasoline, benzene, diester oil, #20 motor oil, 10% sodium hydrozide and concentrated sulfuric acid.

The product of this example is a particularly useful gasket and diaphragm material for high speed aircraft.

Example II

A satin-weave aromatic polyamide fabric is made from 290 denier/160 filament yarn, which is constructed of continuous filaments of the high molecular weight aromatic polyamide known as poly(meta-phenylene isophthalamide). The construction of the fabric is 60 x 55 (threads per inch in warp and filler).

Four coats of the composition described in Example I are applied to the above fabric by alternately dipping it in the elastomer solution and evaporating the solvents. On curing the coated fabric according to the press and oven procedure of Example I, a flexible and durable product is obtained which has the same outstanding heat stability and resistance to solvents and chemicals as the product of that example.

The product is useful for making flexible, heat resistant cells for storing guided missile fuels.

Example III

The following fluorinated elastomer coating composition is prepared by first mixing the first five ingredients on a rubber mill, then blending this mixture with the solvents in which the carbamate curing agent has previously been dissolved:

| | Parts |
|---|---|
| Elastomeric reaction product of 50 parts of vinylidene fluoride and 50 parts hexafluoropropene | 33.74 |
| Zinc oxide | 3.71 |
| Carbon black | 16.87 |
| Lead stearate | 0.34 |
| Hexamethylene diamine carbamate | 0.34 |
| Toluol | 22.50 |
| Methyl isobutyl ketone | 22.50 |
| | 100.00 |

Example I is then repeated, except for the substitution of the above described coating composition, with substantially the same results.

Example IV

The following coating composition is prepared.

| Calender coating composition: | Parts |
|---|---|
| Elastomeric reaction product of 50 parts vinylidene fluoride and 50 parts hexafluoropropene | 100.0 |
| Zinc oxide | 10.0 |
| Dibasic lead phosphite | 10.0 |
| Hydrated silica | 20.0 |
| Dicumyl peroxide | 3.0 |
| Stearic acid | 0.5 |
| | 143.5 |

The above ingredients are thoroughly mixed on a water-cooled 2-roll rubber mill.

The aromatic polyamide fabric of Example I is base coated by dipping it in a 40% solution of the above composition (except the stearic acid was omitted) dissolved in methyl ethyl ketone, followed by forced drying. A total (dry basis) coating weight of 2 oz. per sq. yd. is deposited on both sides and within the fabric. Then the base coated fabric is calender coated with the above calender coating composition on a three roll calender, whereby a coating weight of 6 oz./sq. yd. is applied to each side of the treated fabric. All three calender rolls are kept at a temperature of 180° F.

The calender coated fabric is cured by the same pressing and heating operations used in Example I. When fully cured, the product is useful for making gaskets and diaphragms which retain their desirable properties in the presence of hot aircraft fuels and hydraulic fluids.

Example V

A high temperature gasket material resistant to corrosive liquids and gases is made by preparing a nonwoven batt of poly(meta-phenylene isophthalamide) 3.0 denier staple fibers 1½ to 3 inches in length on a card. The non-woven batt from the card is needle punched to give it added strength followed by dipping in the dip coating composition of Example IV and passing the treated batt through a heat zone to expel the volatile solvent.

The term "coating," as used throughout the specification and claims, means the copolymer composition present within the interstices or on the surface of the fabric and the invention contemplates impregnated as well as surface coated fabrics.

The fabrics useful in carrying out this invention are those made from filaments or fibers of the aromatic polyamides defined hereinabove. The preferred fiber is poly(meta-phenylene isophthalamide). Other specific aromatic polyamides falling within the scope of this invention include poly(4-methyl-meta-phenylene isophthalamide), poly(bis 4-phenylene) methane isophthalamide and poly(meta-phenylene chloroisophthalamide). Also fibers formed from the reaction product obtained by reacting a solution of bis(4-aminophenyl) sulfone and diethylaniline dissolved in dimethyl tetramethylene sulfone with a solution of isophthaloyl chloride dissolved in dimethyl tetramethylene sulfone, prepared as described in Example XXIV of copending application Serial No. 642,928, filed February 28, 1957, by Hill et al. and now abandoned, are useful in making the fabrics to serve as a substrate for the copolymer coatings of this invention. Non-woven fabrics or felts of such fibers can be used as well as various woven and knitted constructions as the substrate for the coating. Other heat resistant fibers or filaments can also be incorporated as a minority component in the fabric structure, such as polytetrafluoroethylene, glass, asbestos and metal fibers. The preferred constructions, however, consist wholly of the heat resistant polyamides.

The copolymers which are useful in making the elastomer coating composition are prepared by copolymerizing about 60 to 15 parts by weight of vinylidene fluoride with about 40 to 85 parts by weight of hexafluoropropene under autogenous pressure at a temperature of about 85 to 100° C., it is preferred to have a polymerization initiator present. The product of this reaction is an elastomeric copolymer containing about 70 to 30% by weight of vinylidene fluoride units and about 30 to 70% by weight of hexafluoropropene units. These copolymers, and the method of preparing them, are described and claimed in copending application S.N. 576,519, filed April 6, 1956, by Dean R. Rexford, and now abandoned.

The essential components of the coating composition are the above-described copolymer and a curing agent. The latter may be any curing agent capable of bringing about complete cure of the copolymer during a reasonable heating cycle. The proportion of curing agent is not critical. Benzoyl peroxide, dicumyl peroxide, and hexamethylene diamine carbamate are preferred curing agents.

The coating composition can contain various other curing activators besides the zinc oxide, dibasic lead phosphite, and magnesium oxide illustrated, e.g., litharge and tribasic lead maleate.

Fillers such as clay, mica and calcium carbonate can be substituted for the hydrated silica. Other well known additives, such as release agents, pigments, and plasticizers can be added to the coating composition of this invention.

Any desired thickness of coating can be applied to one or both sides of the fabric, employing any suitable method known in the art, such as, e.g., calendering, doctor knife coating, dipping, extruding, or laminating preformed films of the coating composition to the heat resistant fabric by means of heat and pressure.

The coating composition on the fabric is cured by heating at a temperature of at least 350° F. for a sufficient period of time to render it substantially insoluble when immersed in methyl ethyl ketone at 80° F. for 24 hours. It is preferred to include in the curing operation a brief initial pressing cycle at a temperature of about 320 to 340° F. and a pressure of about 40 to 70 p.s.i.

A surprising advantage of the coated fabric of this invention over those of the prior art is its exceptional retention of strength and flexibility after prolonged exposure at temperatures up to about 500° F., and even higher. It is even useful for limited periods at about 600° F. Another advantage is its retention of strength properties while at these elevated temperatures. A particular advantage is its excellent resistance to deterioration and attack by solvents and chemicals which deleteriously affect most all prior art organic coating compositions. Further advantages are its rubber-like flexibility, flex resistance, and the ease with which it can be made.

There are numerous uses for a material having such a unique combination of properties as the product of this invention. In addition to the previously mentioned uses in the aircraft and guided missile industries, this new material is useful for making curing bags for vacuum lamination and conveyor belting.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A heat stable coated fabric comprising a wholly aromatic polyamide fabric having a coating consisting essentially of a cured copolymer containing about 30 to 70% by weight of vinylidene fluoride and about 70 to 30% by weight of hexafluoropropene, the aromatic polyamide of said fabric being a polymer characterized by the recurring structural unit

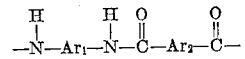

wherein $Ar_1$ and $Ar_2$ are divalent aromatic radicals in which the chain-extending bonds are attached to non-adjacent carbon atoms in an aromatic ring, said polymer having an inherent viscosity of at least 0.8 and a melting point of at least 300° C. and said coated fabric being characterized by its ability to retain substantially all of its original tensile strength after it is exposed for 5 days at a temperature of 500° F.

2. The product of claim 1 in which the aromatic polyamide of said fabric is poly(meta-phenylene isophthalamide).

3. The product of claim 1 in which the fabric is woven.

4. The product of claim 1 in which the fabric is non-woven.

5. The method of making a heat stable coated fabric comprising coating a wholly aromatic polyamide fabric with a composition consisting essentially of a copolymer containing about 30 to 70% by weight of vinylidene fluoride and about 70 to 30% by weight of hexafluoropropene and a curing agent, and heating the coated fabric at a temperature of at least 350° F. for a sufficient period of time to cure said composition, the aromatic polyamide of said fabric being a polymer characterized by the recurring structural unit

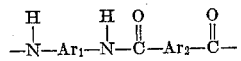

wherein $Ar_1$ and $Ar_2$ are divalent aromatic radicals in which the chain-extending bonds are attached to non-adjacent carbon atoms in an aromatic ring, said polymer having an inherent viscosity of at least 0.8 and a melting point of at least 300° C. and said coated fabric being characterized by its ability to retain substantially all of its original tensile strength after it is exposed for 5 days at a temperature of 500° F.

6. The method of claim 5 in which the aromatic polyamide of said fabric is poly(meta-phenylene isophthalamide).

7. The method of claim 5 in which the fabric is woven.

8. The method of claim 5 in which the fabric is non-woven.

(References on following page)

References Cited in the file of this patent

UNITED STATES PATENTS

| | | |
|---|---|---|
| 2,244,192 | Flory | June 3, 1941 |
| 2,245,129 | Greenewalt | June 10, 1941 |
| 2,252,554 | Carothers | Aug. 12, 1941 |
| 2,468,054 | Ford | Apr. 26, 1949 |
| 2,549,935 | Sauer | Apr. 24, 1951 |
| 2,625,536 | Kirby | Jan. 13, 1953 |
| 2,752,331 | Dittman et al. | June 26, 1956 |
| 2,770,606 | Teeters et al. | Nov. 13, 1956 |
| 2,779,687 | Buchanan et al. | Jan. 29, 1957 |
| 2,782,174 | Hetherington et al. | Feb. 19, 1957 |